Feb. 1, 1966
A. NISHKIAN
3,232,246
PATTY SHELL FORMING DEVICE
Original Filed Aug. 10, 1960
2 Sheets-Sheet 1
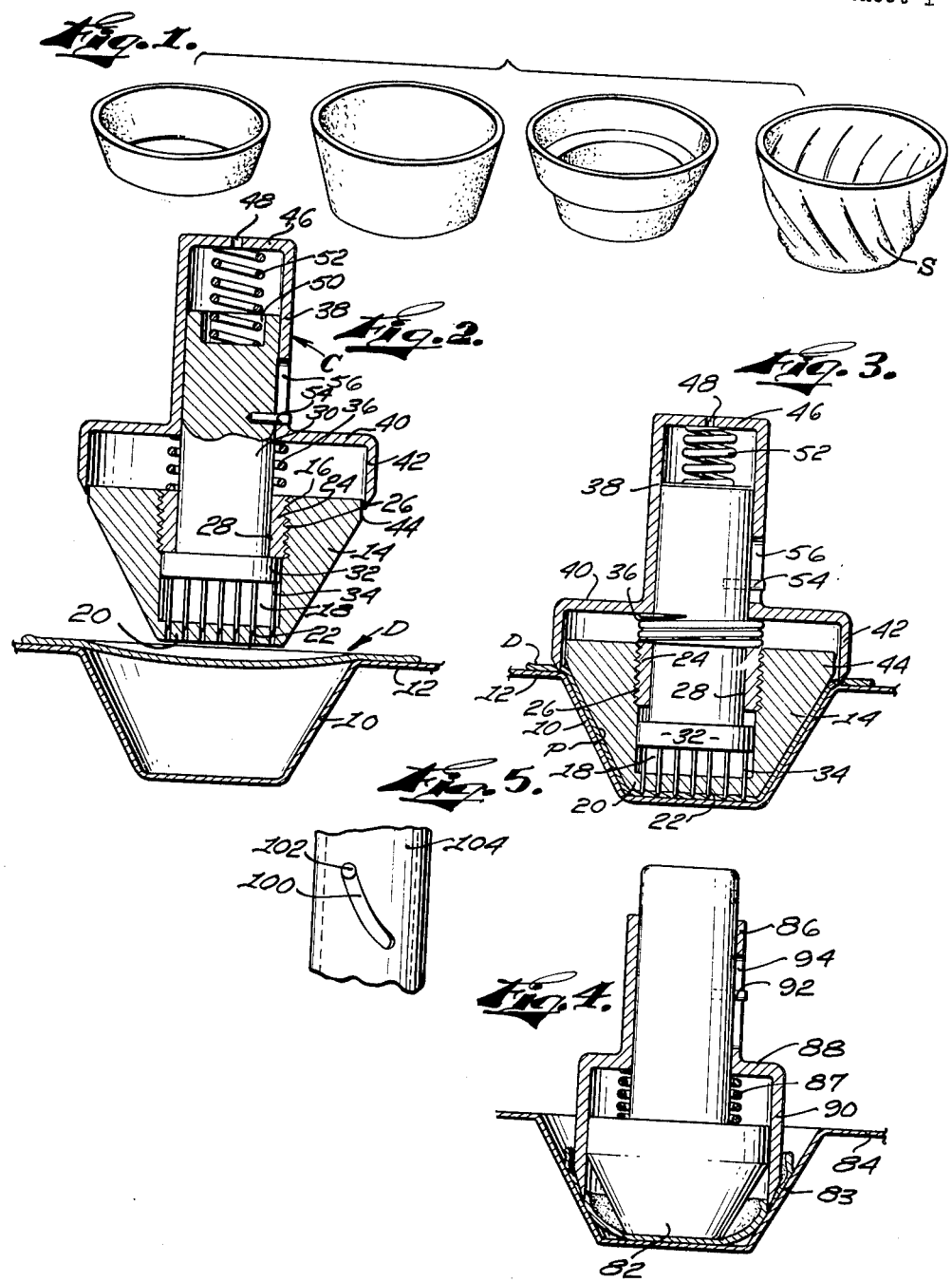
INVENTOR.
ARCINAE NISHKIAN
BY
Fulwider, Patton, Rieber
Lee and Utecht
ATTORNEYS Feb. 1, 1966  A. NISHKIAN  3,232,246
PATTY SHELL FORMING DEVICE
Original Filed Aug. 10, 1960  2 Sheets-Sheet 2
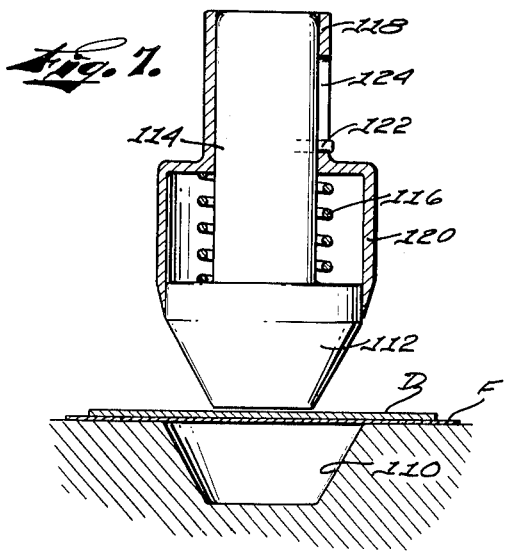
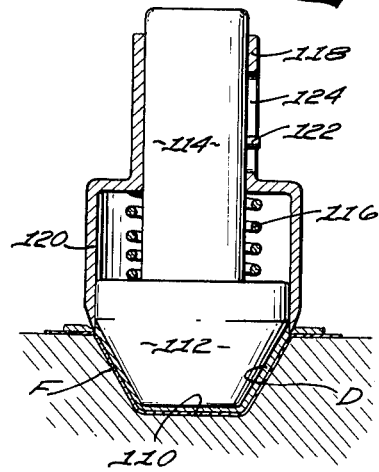
INVENTOR.
ARCINAE NISHKIAN
BY Fulwider, Patton, Rieber,
Lee and Utecht
ATTORNEYS

United States Patent Office 3,232,246
Patented Feb. 1, 1966

3,232,246
PATTY SHELL FORMING DEVICE
Arcinae Nishkian, 1330 Olympic Blvd.,
Santa Monica, Calif.
Original application Aug. 10, 1960, Ser. No. 48,681, now Patent No. 3,155,055, dated Nov. 3, 1964. Divided and this application Mar. 20, 1964, Ser. No. 353,481
2 Claims. (Cl. 107—49)

This is a division of my copending patent application entitled Patty Shell Forming Device, Ser. No. 48,681, filed Aug. 10, 1960, and now Patent No. 3,155,055, dated Nov. 3, 1964, and the benefit of that filing date is claimed for this division.

This invention relates generally to tools for molding various shapes and sizes of pastries, such as patty shells, in a forming cavity.

One of the main objects of the invention is to provide a manually operated molding tool that can be varied in design for use with a forming cavity or mold.

Another object of the invention is to provide a manually operated patty shell molding tool in which a telescoping dough cutter is sleeved to the plunger that extends from the molding head.

Still another object of the invention is in the provision of a spring connection between the sleeved telescoping cutter and the molding head.

A further object of the invention lies in the manner of enclosing the head operating plunger with an apertured cutter sleeve spring suspended from the molding head.

A still further object of the invention is in the provision of a patti shell molding and cutting tool for forming foil-wrapped patty shells.

A further object of the present invention is to provide a patti shell molding device which is foolproof in operation and may be readily operated by housewives.

Yet a further object of the invention is to provide apparatus of the aforedescribed nature which is simple in design and rugged of construction whereby it may provide a long and trouble-free service life.

Another object of the invention is in the provision of a manually operated device that is adjustable to produce practically any shape of patty shell desired.

With the foregoing objects in view, and such other objects and advantages as will become apparent to those skilled in the art to which this invention relates as this specification proceeds, the invention consists essentially in the arrangement and construction of parts all as hereinafter more particularly described, reference being had to the accompanying drawing in which:

FIG. 1 is a perspective view showing several shapes of patty shells that may be formed by apparatus embodying the present invention;

FIG. 2 is an elevational view partially in section of one embodiment of the invention showing the device ready for use;

FIG. 3 is a view similar to FIG. 2 showing the device in molding use;

FIG. 4 is an elevational view partially in section of another device embodying the present invention;

FIG. 5 is an enlarged detail perspective view of the cam mechanism for partial rotation of the molding head of the device of FIG. 4;

FIG. 6 is a perspective view of a foil-supported patty dough adapted to be worked by apparatus embodying the present invention;

FIG. 7 is an elevational view partially in section of a tool for molding the foil-wrapped patty shell of FIG. 6;

FIG. 8 is a view similar to FIG. 7 showing the tool in actual use; and

FIG. 9 is a perspective view of the molded foil-wrapped patty shell.

Several embodiments of manually operated patty shell forming devices embodying the present invention are shown in FIGS. 2, 4, 5 and 7.

Referring to FIG. 1, there are shown various forms of patty shells which may be formed by devices embodying the present invention. It is possible with such devices to vary the shape and size of the patty shell by changing the forming mold and varying the manual operation. In FIGS. 2 and 3, one embodiment of a manually operated device is disclosed. A circular female or mold cavity 10 has an upper surrounding flange 12. A layer of dough D is disposed across the cavity opening 10 and upon the flange 12. The manual forming tool includes a molding head 14 which has the same configuration as the cavity 10. The head 14 includes a threaded opening 16 and a hollow recess 18. The lower face or edge 20 of the head 14 is multiple perforated at 22. A detachable assembly plug 24 is threadably received at 26 within the threaded opening 16 of the head 14. The plug 26 is bored at 28 to slidably receive a sleeve guide or plunger 30 having an enlarged lower end 32 underlying the plug 26. A plurality of needles 34 project downwardly from the lower face of the plunger 20. A coil spring 36 surrounds the plunger 30 and rests upon the upper edge of the plug 26. Resting upon the coil spring 36 is a dough cutting apparatus generally referred to as C. This apparatus includes a sleeve 38 surrounding and slidably engaging the plunger 30. The sleeve 38 has a laterally extending annular or circular flange 40 located above the upper face of the head 14, and also has an integrally formed downwardly projecting circular dough cutter 42 that immediately surrounds and telescopes a cylindrical portion 44 extending between the outwardly sloping wall portion and the upper face of the molding head 14. The sleeve 38 is enclosed at 46 and apertured at 48 to permit escape of air. The upper end of the plunger 30 is recessed at 50 to receive the lower end of a coil spring 52 that suspends the sleeve 38 over the plunger 30. An assembly pin 54 in the plunger 30 is received in a slot 56 in the sleeve 38.

The operation of the manually operated patty shell forming device of FIGS. 2 and 3 is simple. The tensioned assembly permits the molding head 14 to be first lowered to molding position as shown in FIG. 2. Further manual compression of the sleeve 38 forces the multiple needles 34 on the tensioned plunger 30 through the bottom of the patty shell P for the purpose of releasing any air compressed in the molding cavity. The multiple perforations also operate to permit escape of steam generated during the later cooking or baking of the shell. The perforations actually seal up during the baking so as to allow for no seepage in the baking shell. Any type of perforating device may be used as later will be explained. The downward movement of the sleeve 38 also forces the telescoping dough cutter 42 against the outer edges of the dough and severance thereof in the manner shown in FIG. 2. Manual withdrawal of the device leaves the perfectly formed dough patty shell in the molding cavity. Various modifications of the device will be described in the present application but it may be understood at this time that the use of the shell is not only for frozen but for all kinds of hors d'oeuvres and other food. It may be considered that all modifications as described herein will produce a bite size, edible souffle cup.

A first modification of a manually operated device is shown in FIG. 4. It is desired in this instance to form a shallow patty shell and therefore a molding head 82 is provided that is smaller than a forming cavity 83.

The mold 83 has the usual flange 84. A sleeve 86 is spring suspended at 87 from the head 82. A circular flange 88 on the sleeve 86 has an integral depending dough cutter 90 that slides downwardly into the forming cavity or mold 83. A similar plunger pin 92 and sleeve slot 94 complete the assembly.

The device operates in the same manner with the exception that the cutter 90 severs the dough edges within the forming cavity 83.

It is also possible with the aforedescribed manually operated devices to shape the patty shell with the swirl S as shown in FIG. 1. To accomplish this result the slot 100 in FIG. 5 is formed in cam shape about the pin 102. Depression of the sleeve 104 thus rotates the head slightly and the dough is wrinkled or swirled as shown in FIG. 1.

FIGS. 6–9 show another modification and different use of a manually operated device. A strip of aluminum foil F is placed beneath the layer of dough D. A flanged forming cavity 110 receives a conforming molding head 112 in the manner shown in FIGS. 2 and 3. The head 112 has a sleeve guide or plunger 114 surrounded by a spring 116. A sleeve 118 having flange suspended circular dough cutter 120 is supported in tensioned manner over the head 112. An assembly pin 122 and slot 124 are of the same construction as previously described. The pin 122 is normally located at the bottom of the slot 124, at which time the cutter 120 remains in engagement with the head 112, as illustrated in FIG. 7. The head 112 depresses the foil and dough in the forming cavity and the cutter 120 serves both the foil and dough to form a foil encased patty shell that may be used in connection with frozen hors d'oeuvres or other foods.

Since various morifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A device for forming a patty shell in a mold cavity, said device comprising:

a molding head having a lower face and an upwardly and outwardly sloping wall portion for disposition within a mold cavity, an upper face, a cylindrical portion extending between said upper face and said sloping wall portion of said molding head, and an elongated cylindrical sleeve guide extending upwardly from said upper face;

a pin extending laterally from said guide;

a sleeve including an elongated cylindrical sleeve portion vertically slidable upon said guide of said head, a cylindrical dough cutter having a sharpened lower edge vertically slidable upon said cylindrical portion of said head, and an annular flange portion connecting said cutter and said sleeve portion, said sleeve portion further including a vertical slot slidably accommodating said pin during relative vertical movement between said sleeve and said head; and an elongated compression spring engageable with said sleeve at one end and with said head at the other end and normally biasing said sleeve upwardly relative to said head, said pin normally engaging the lower extremity of said slot and preventing said cutter lower edge from moving upwardly out of slidable engagement with said cylindrical portion of said head whereby said cutter lower edge and said cylindrical portion are always maintained in operative alignment.

2. A device for forming a patty shell in a mold cavity, as set forth in claim 1, wherein said compression spring surrounds said guide and engages said upper face at one end and engages said flange portion at the other end.

References Cited by the Examiner

UNITED STATES PATENTS

| | | | |
|---|---|---|---|
| 650,652 | 5/1900 | Pieper | 101—30 |
| 1,991,588 | 2/1935 | Waterman | 107—49 |
| 2,127,651 | 8/1938 | Panther | 107—15.9 |
| 2,280,324 | 4/1942 | Tracy | 107—15.9 X |
| 2,379,140 | 6/1945 | Frank | 107—47 |
| 2,409,021 | 10/1946 | Dale | 107—49 |
| 2,896,555 | 7/1958 | Marcus et al. | 107—49 X |
| 2,975,741 | 3/1961 | Ruffino | 107—19 X |

WALTER A. SCHEEL, *Primary Examiner.*

ROBERT E. PULFREY, *Examiner.*